United States Patent
Tanaka

(12) 
(10) Patent No.: US 6,491,448 B2
(45) Date of Patent: Dec. 10, 2002

(54) CAMERA HAVING A LENS COVER

(75) Inventor: Yasuhiko Tanaka, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/790,805

(22) Filed: Feb. 23, 2001

(65) Prior Publication Data

US 2001/0017983 A1 Aug. 30, 2001

(30) Foreign Application Priority Data

Feb. 29, 2000 (JP) .................................. 2000-053962

(51) Int. Cl.[7] .............................................. G03B 17/04
(52) U.S. Cl. ...................... 396/348; 396/448; 396/543
(58) Field of Search ............................ 396/448, 348, 396/543

(56) References Cited

U.S. PATENT DOCUMENTS 4,557,574 A * 12/1985 Kohno et al. ............... 396/176
5,943,520 A * 8/1999 Komatsuzaki et al. ...... 396/177
5,943,521 A * 8/1999 Lamphron et al. .......... 396/448

FOREIGN PATENT DOCUMENTS

JP          4-3300          2/1992
JP         11-231376        8/1999

* cited by examiner

Primary Examiner—David M. Gray
(74) Attorney, Agent, or Firm—Young & Thompson

(57) ABSTRACT

A slide cover is movably attached to a camera body. The slide cover is moved to a photographing position when a picture is taken. At the time of photographing, the slide cover is utilized as a right-hand grip. A rear face of the slide cover is provided with a zoom operating member which is swingable around a horizontal shaft. An upper side of the zoom operating member is a telephoto operating portion, and a lower side thereof is a wide-angle operating portion. The telephoto operating portion and the wide-angle operating potion are vertically arranged so as to be perpendicular to a moving direction of the slide cover.

11 Claims, 4 Drawing Sheets

CAMERA HAVING A LENS COVER

BACKGROUND OF THE INVENTION

1. Field of the Invention

The present invention relates to a camera having a lens cover, and more particularly to a camera in which a slidable lens cover is provided with a pair of operating portions for inputting two kinds of correlative operation signals.

2. Description of the Related Art

As described in Japanese Patent Laid-Open Publication No. 11-231376, there is a camera having a slide cover of a box-like shape. Such a camera is covered with the slide cover from a right-hand-grip side of a camera body. When the slide cover is slid toward the right to be moved from a closed position to a photographing position, a taking lens provided in the front of the camera body emerges. The moved slide cover is held by a right hand and is utilized as a grip. Owing to this, the right hand gripping the camera is separated from the taking lens so that it may be prevented to take a picture overlapped by a finger.

In the above-mentioned camera, a shutter button is attached to the slide cover so as to be easily pressed by a finger of the right hand gripping the camera. When the slide cover is moved to the photographing position, the shutter button is moved to a position where a release switch provided in the camera body is actuated. Thus, the shutter button is set in an operatable state. As to an operational member actuated at the time of photographing in watching through a viewfinder, for example as to the shutter button, it is advantageous to attach the operational member to the slide cover in view of its operating characteristics.

As the typical operational member pressed in watching through the viewfinder, there is a zoom operating member for varying a magnification of the taking lens. This zoom operating member is constituted of a pair of operating portions of a wide-angle side and a telephoto side. The wide-angle-side operating portion is actuated to vary the magnification toward the wide-angle side. The telephoto-side operating portion is actuated to vary the magnification toward the telephoto side. A photographer can actuate the operating portions, observing the change of the magnification through the viewfinder.

When the zoom operating member is attached to the slide cover, a pair of switches for detecting the zoom operating member are incorporated in the camera body, similarly to the shutter button. These switches are for detecting which of the operating portions of the wide-angle side and the telephoto side has been actuated. In such a case, it is required to move the operating portion to a position where the switch thereof is surely and smoothly actuated after moving the slide cover to the photographing position.

By the way, the respective operating portions of the wide-angle side and the telephoto side are advantageous to be arranged such as to be easily actuated by the same finger of the right hand gripping the camera. In view of this, when the operating portions are arranged on the slide cover, each of them should be disposed within a range of a predetermined distance from a grip edge of the slide cover. On the other hand, with respect to the switches for detecting the operating portions, there is a restriction that these switches should be incorporated into the camera body in consideration of a positional relationship which concerns the slide cover having been moved to the photographing position.

As a result, there arises a problem in that a space of the camera body for incorporating the switches becomes difficult to be obtained in accordance with an increase of a moving amount of the slide cover. In case the moving amount of the slide case is short or in case the operating portion is provided at a position separated from the grip edge, the space of the camera body for incorporating the switches may be easily obtained. However, in the former case, a picture overlapped with a finger is likely to be taken, and in the latter case, there is a problem concerning its operating characteristics.

SUMMARY OF THE INVENTION

In view of the foregoing, it is a primary object of the present invention to provide a camera in which a space for incorporating switches is obtained in a camera body even though a moving amount of a slide cover is comparatively extended when the slide cover is provided with a pair of operating portions for inputting two kinds of correlative operation signals, such as a zoom operating member.

It is a second object of the present invention to provide a camera which has advantages relative to its operating characteristics when a slide cover is provided with a pair of operating portions for inputting two kinds of correlative operation signals, such as a zoom operating member.

In order to achieve the above and other objects, the camera according to the present invention comprises a pair of operating portions for inputting two kinds of correlative operation signals. These operating portions are arranged so as to be perpendicular to a moving direction of a slide cover.

When the slide cover is moved to a photographing position, the operating portions are moved to positions for actuating respective switches provided in a camera body. These switches may be arranged so as to be perpendicular to the moving direction of the slide cover similarly to the operating portions.

Thus, it is not caused that only one of the switches is biased toward a side of the camera body. Moreover, the pair of the operating portions are located at respective positions separated by an equal length from a grip side of the slide case so that its operating properties are improved.

In a preferred embodiment, the present invention is applied to a zoom operating member. In this case, it is preferable to use a single member of a teeter type, both sides of which are adapted to be a telephoto-side operating portion and a wide-angle-side operating portion respectively.

According to the present invention, the slide cover is provided with a pair of the pressed operating portions for inputting two kinds of the correlative operation signals. These operating portions are arranged in the perpendicular direction to the moving direction of the slide cover. Owing to this, when the slide cover is utilized as the grip, locations of the respective operating portions are adapted to be substantially equal from the grip end so that actuation thereof may be easily performed. Further, in accordance with this, the switches incorporated in the camera body are arranged in the same direction. Thus, the moving length of the slide cover may be extended despite a compact size, and gripping properties and handling properties may be improved.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
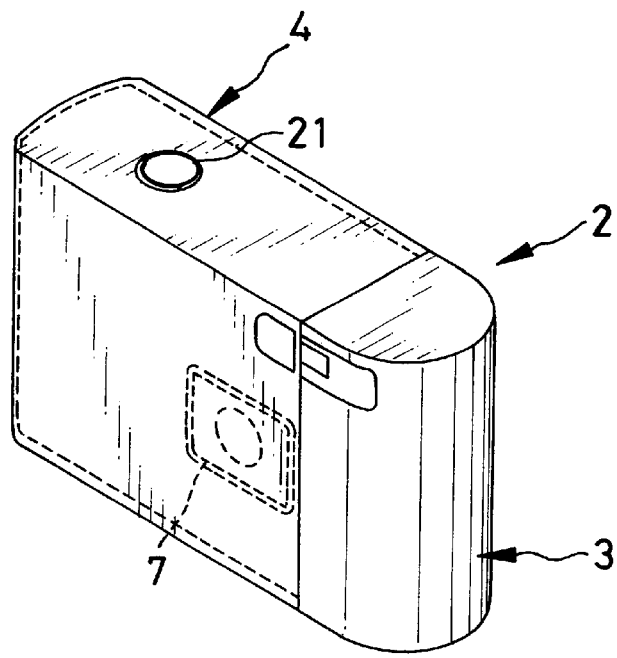
FIG. 1 is a perspective view showing a non-usage state of a camera according the present invention.
Figure 2:
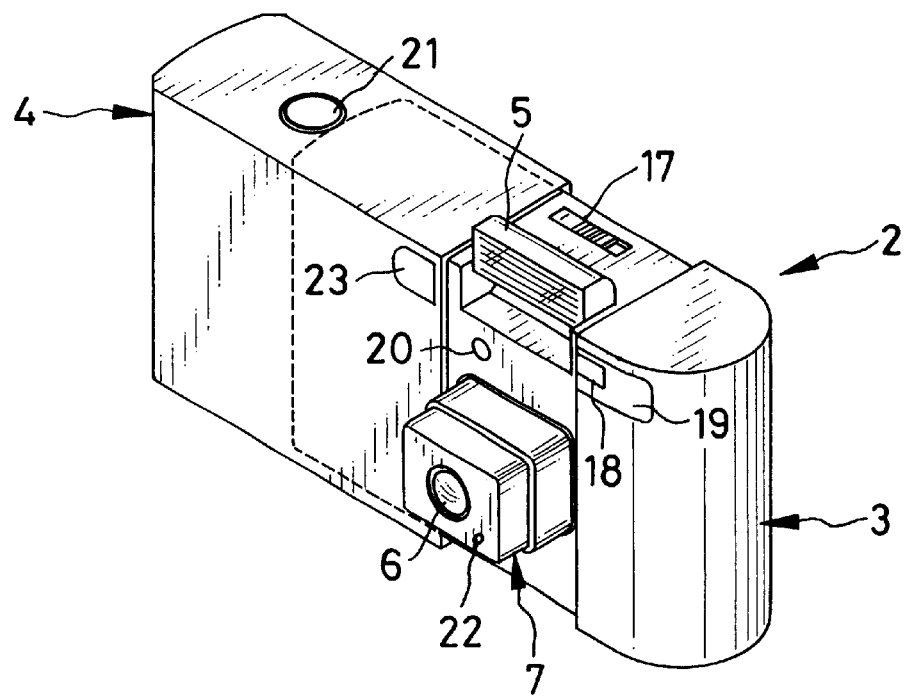
FIG. 2 is a perspective view showing a photographing state of the camera.

FIGS. 1 and 2 respectively show a non-usage state and a photographing state of a camera according to the present invention. The camera 2 is constituted of a camera body 3 and a slide cover 4. The camera body 3 has an approximately parallelepiped shape. The slide cover 4 has a box-like shape and is attached to the camera body 3 so as to cover it from a right-hand-grip side thereof. The slide cover 4 is made of a thin metal plate being light and having high strength, and is made through a drawing process. The thin metal plate is, for example, aluminum or titanium. Incidentally, the slide cover 4 may be made of a plastic to lower the cost.

The slide cover 4 is movable relative to the camera body 3 between a closed position shown in FIG. 1 and a photographing position shown in FIG. 2. Moreover, the slide cover 4 is capable of being further slid from the photographing position to a cartridge exchanging position shown in FIG. 3. When the slide cover 4 is moved from the closed position to the photographing position, a flash unit 5 is raised by means of a spring. In association with this, a power switch is turned on. Upon turning on the power switch, a lens barrel 7 holding a taking lens 6 is protruded from a collapsible-mount position.

Figure 3:
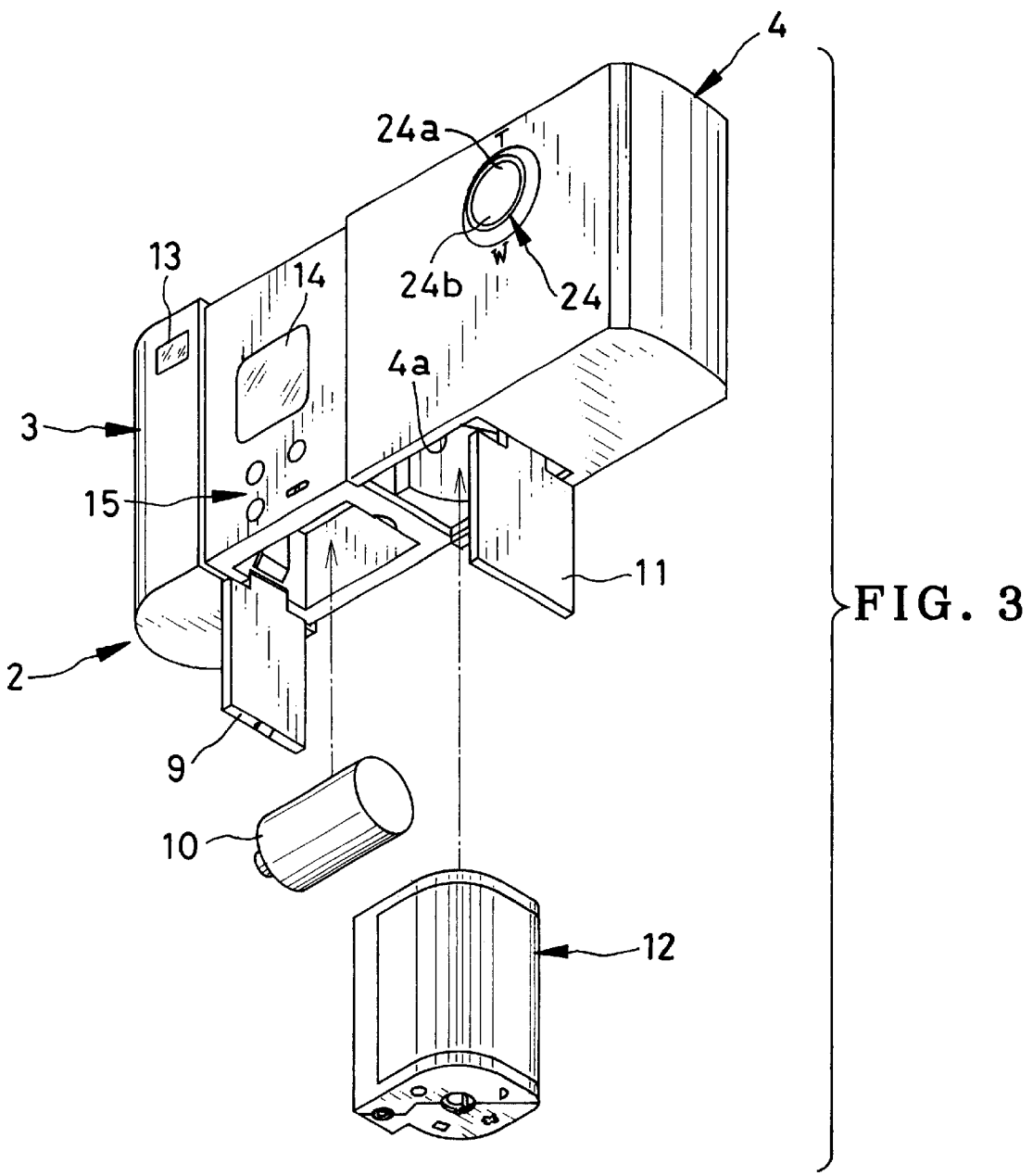
FIG. 3 is a perspective view showing a rear side of the camera in a state that a slide cover is moved to a cartridge exchanging position.

As shown in FIG. 3, the bottom of the slide cover 4 is formed with a cut portion 4a. Owing to this cut portion 4a, a battery 10 can be exchanged by opening a battery-chamber lid 9, even if the slide cover 4 is set to the closed position. When the slide cover 4 is moved to the cartridge exchanging position, a cartridge-chamber lid 11 is bared through the cut portion 4a. In this state, a film cartridge 12 can be removed and exchanged by opening the cartridge-chamber lid 11, such as shown FIG. 3. Incidentally, in the drawing, reference numerals 13 and 14 respectively denote a viewfinder eyepiece and an LCD panel for displaying photographic information. Further, reference numeral 15 denotes an inputting portion for setting a photographing mode and an imprinted date. The LCD panel 14 and the inputting portion 15 are fully covered when the slide cover 4 is moved to the closed position.

The slide cover 4 is locked after being moved from the closed position to the photographing position. Upon locking, the slide cover 4 can not be moved in a closing direction and in an opening direction. Thus, the slide cover 4 is adapted not to be carelessly moved at the time of photographing. By the way, upon actuating a lock releasing member 17, the slide cover 4 can be moved to the cartridge exchanging position. Meanwhile, when the flash unit 5 is retracted, the flash unit 5 is retained in a retractable position and the lens barrel 7 is collapsed. Further, the lock of the slide cover 4 in the closing direction is released so that the slide cover 4 may be returned to the closed position.

A front face and an upper face of the camera body 3 are provided with a viewfinder window 18, a light emitting window 19 for photometry, a luminous indicator 20 used for a self-timer, and a shutter button 21. The front of the lens barrel 7 is provided with a photometry window 22. A front face of the slide cover 4 is provided with a light receiving window 23 for measuring a distance. When the slide cover 4 is moved to the photographing position, the light receiving window 23 is located in front of a light receiving unit for measuring the distance which is incorporated in the camera body 3.

As the taking lens 6, is used a zoom lens. For varying a magnification of the zoom lens, a zoom operating member 24 having a disk-like shape is attached to the back of the slide cover 4 such as shown in FIG. 3. The zoom operating member 24 is swingable in an up-and-down direction and is supported by the slide case 4. An upper side of the zoom operating member 24 is adapted to be a telephoto operating portion 24a, and a lower side thereof is adapted to be a wide-angle operating portion 24b. When the telephoto operating portion 24a is pressed by a thumb of a gripping right hand, the lens barrel 7 is protruded to vary the magnification of the taking lens toward the telephoto side. When the wide-angle operating portion 24b is pressed, the lens barrel 7 is drawn back to vary the magnification toward the wide-angle side. When the thumb is separated from the zoom operating member 24, it returns to a neutral position to stop varying the magnification.

Figure 4:
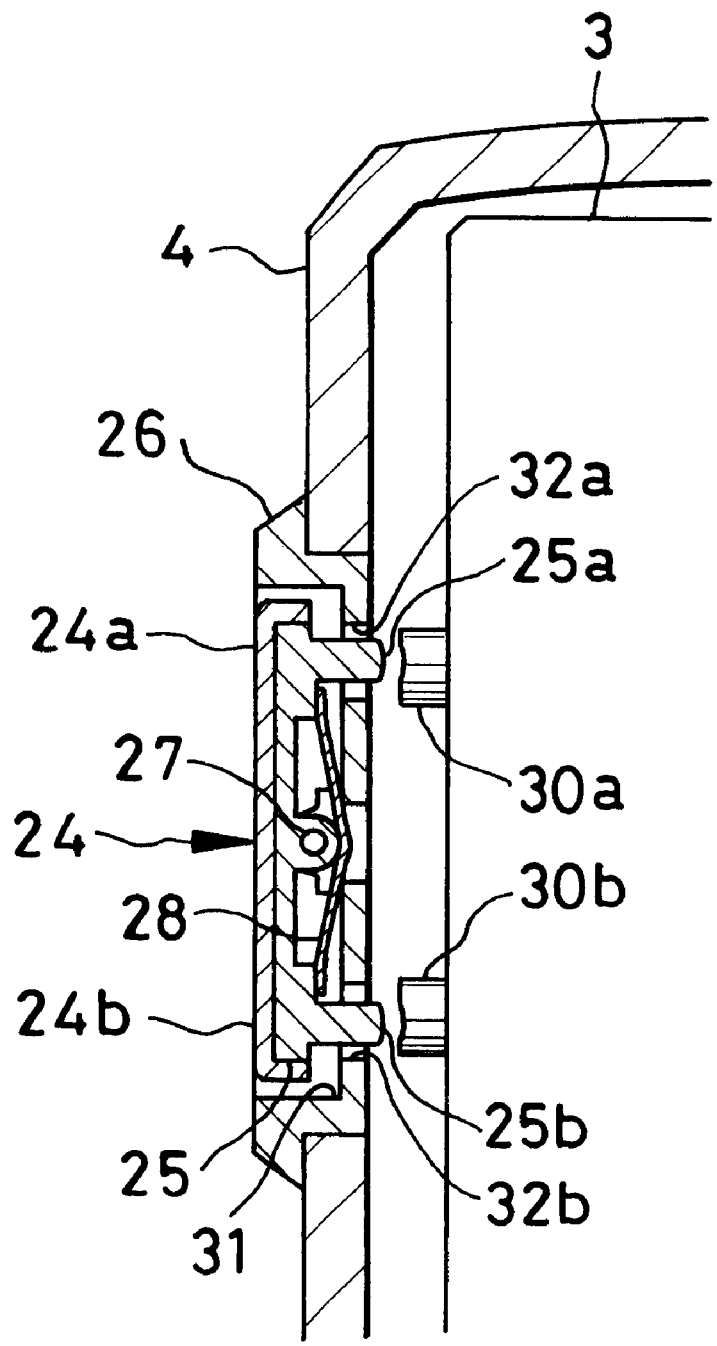
FIG. 4 is a partial section view showing a zoom operating member in a state that the slide cover is moved to a photographing position.

As shown in FIG. 4, an actuating plate 25 is fixed to the inside of the zoom operating member 24. This zoom operating member 24 is contained in a circular concave 31 formed in a decorative member 26. The actuating plate 25 is attached to a horizontal shaft 27 provided in the concave 31 of the decorative member 26. In other words, the zoom operating member 24 is attached to the decorative member 26 via the shaft 27. The decorative member 26 is fitted to an opening formed in the slide cover 4, and is fixed by an adhesive. Both ends of a leaf spring 28 are pressed against the roots of projections 25a and 25b. Thus, in a normal state, the zoom operating member 24 is kept in a neutral position shown in FIG. 4. The projections 25a and 25b turn on and off a pair of zoom switches described later.

Figure 5A:
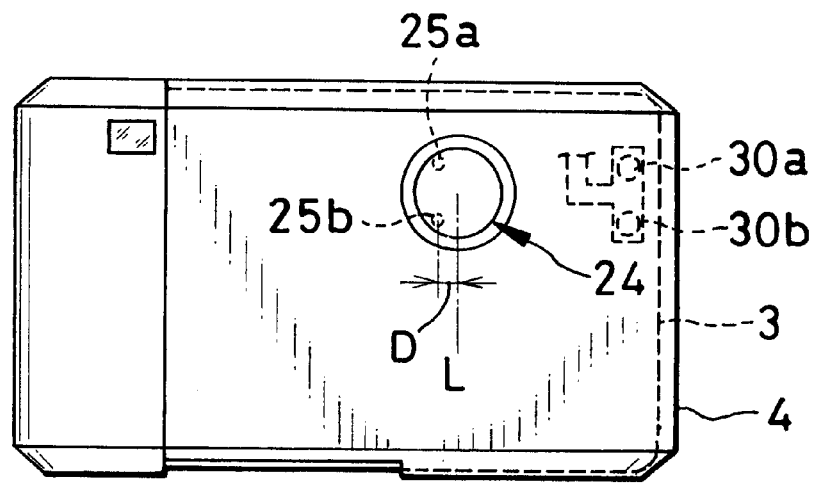
FIG. 5A is a rear view of the camera showing a state in that the slide cover is closed.

The projections 25a and 25b of the actuating plate 25 respectively pass through holes 32a and 32b formed in the bottom of the concave 31 of the decorative member 26 so as to slightly protrude the top ends thereof inside the slide case 4. As shown in FIG. 5A, the projections 25a and 25b are perpendicular to the sliding direction of the slide cover 4, and are shifted in the closing direction of the slide cover 4 by a distance D from a center line L passing through a center of the zoom operating member 24.

Figure 5B:
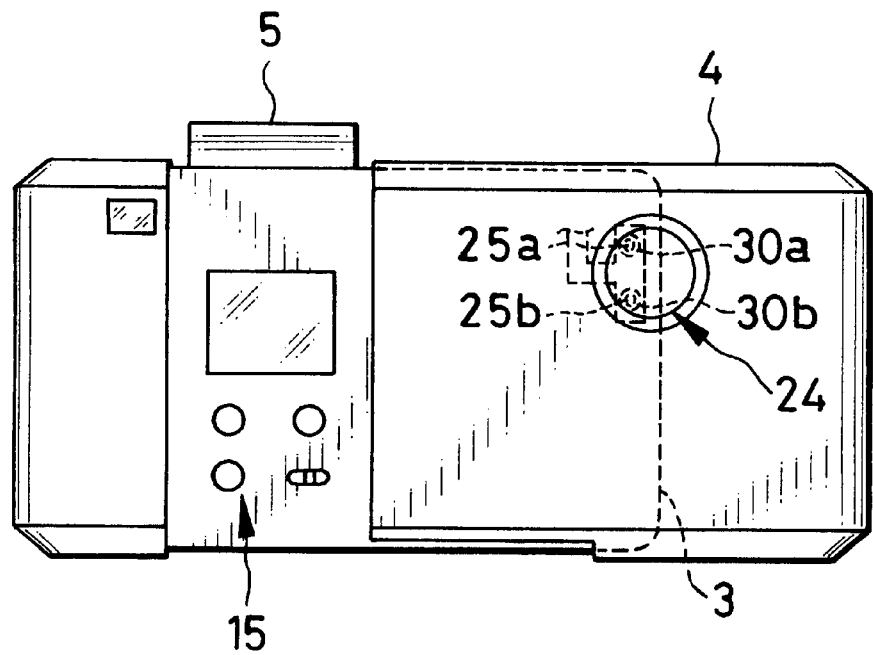
FIG. 5B is a rear view of the camera showing a state in that the slide cover is moved to the photographing position.

When the slide cover 4 is moved to the photographing position shown in FIG. 5B, the projections 25a and 25b respectively face a telephoto switch 30a and a wide-angle switch 30b which are incorporated in the camera body 3. Upon pressing the telephoto operating portion 24a of the zoom operating member 24, the actuating plate 25 is swung in a clockwise direction around the shaft 27 so that the projection 25a presses the telephoto switch 30a. Owing to this, the lens barrel 7 is protruded to the front to vary the magnification toward the telephoto side. Meanwhile, when the wide-angle operating portion 24b is pressed, the lens barrel 7 is drawn back to vary the magnification toward the wide-angle side.

When the slide cover 4 is moved to the closed position or to the cartridge exchanging position, the zoom operating member 24 is also moved together with the slide case 4. Thus, such as shown in FIG. 5A, the projections 25a and 25b of the actuating plate 25 are moved to a position shifted from the telephoto switch 30a and the wide-angle switch 30b. In virtue of this, the magnification is not varied, even if the zoom operating member 24 is actuated.

As described above, the zoom operating member 24 is constructed by a single member of a teeter type which is supported by the horizontal shaft 27. Further, the upper side of the zoom operating member 24 is adapted to be the telephoto operating portion 24a, and the lower side thereof is adapted to be the wide-angle operating portion 24b. These operating portions are arranged so as to be perpendicular to the moving direction of the slide cover 4. Accordingly, the telephoto operating portion 24a and the wide-angle operating portion 24b may be easily pressed only by slightly tilting the thumb upward or downward in a state that the grip portion of the slide cover 4 is held by the right hand and the thumb thereof is put on the central portion of the zoom operating member 24.

In case the telephoto operating portion 24a and the wide-angle operating portion 24b are arranged in a horizontal direction, the telephoto switch 30a and the wide-angle switch 30b should be laterally incorporated in the camera body 3. Moreover, in order to fit operational feeling relative to the respective switches, the center line L of the zoom operating member 24 is required to coincide with the middle of the switches 30a and 30b which are laterally arranged. Due to this, the setting is restricted regarding the position for incorporating the zoom operating member 24 and the photographing position of the slide cover 4. Further, it is necessary to separate the zoom operating member 24 from the grip end of the slide cover 4 to some extent so as to be easily actuated. For this reason, the moving length of the slide cover 4 from the closed position to the photographing position is difficult to be considerably extended.

By contrast, when the telephoto operating portion 24a and the wide-angle operating portion 24b are arranged in the perpendicular direction to the moving direction of the slide cover 4 such as described in the foregoing, the telephoto switch 30a and the wide-angle switch 30b are incorporated in the camera body 3 such as to be vertically arranged. Accordingly, by incorporating these switches fully near to the side of the camera body 3 within a permitted range, the moving length of the slide cover 4 from the closed position to the photographing position may be considerably extended, even if the zoom operating member 24 is separated from the grip end of the slide cover 4 to some extent.

The projections 25a and 25b are biased in the closing direction of the slide cover 4 by the distance D from the center line of the zoom operating member 24. Thus, the photographing position of the slide cover 4 may be set to a right side shifted by the distance D relative to the position for incorporating the switches 30a and 30b. Owing to this, the photographing position of the slide cover 4 may be set in a comparatively free way.

In the foregoing, the present invention is described based on the embodiment shown in the drawings. However, the zoom operating member 24 is not exclusive to the construction by a single member. The telephoto operating portion 24a and the wide-angle operating portion 24b may be respectively constituted of an individual press button, for example. As to the pressed operating member for inputting two kinds of the correlative operation signals, it is not exclusive to the zoom operating member. For instance, the present invention is applicable to a case in that exposure adjustment information is displayed in a viewfinder. In this case, adjustment of a plus side is performed by one of pressed operating portions, and adjustment of a minus side is performed by the other thereof.

The above embodiment is described regarding the telephoto switch and the wide-angle switch which are correlative. The switches, however, may not have correlativity. For instance, a flash-mode flashing switch and a date-mode selecting switch may be selectively operated.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera having a camera body in which a taking lens is included, said camera comprising:
   a slide cover movably attached to said camera body, said slide cover being moved between a closed position for covering said taking lens and a photographing position where said taking lens emerges, and said slide cover being utilized as a grip at said photographing position;
   a plurality of pressure portions provided on said slide cover and for inputting a plurality of operation signals, said pressure portions being arranged so as to be perpendicular to a moving direction of said slide cover;
   an operation member integrally provided with said pressure portions; and
   a plurality of switches attached to said camera body so as to correspond to said pressure portions, said switches being disposed in a direction perpendicular to said moving direction of said slide cover, and said switches operationally facing said pressure portions when said slide cover is set to said photographing position, the operation member being positioned on the slide cover so that when the slide cover is in the photographing position, a first portion of the operation member overlies the camera body, and a second portion of the operation member is positioned beyond an outer edge of the camera body.

2. A camera according to claim 1, wherein said pressure portion is a projection protruding toward said camera body.

3. A camera according to claim 2, wherein a number of said projections is two and said operation member is of a teeter type swinging around a horizontal shaft, said projections being respectively provided at both sides relative to said shaft.

4. A camera according to claim 3, wherein said operation member is normally set to a neutral position by a leaf spring against which said projection actuates said switch.

5. A camera according to claim 4, wherein said operation member has a disk shape.

6. A camera according to claim 5, wherein said projection is shifted from a center line of said operation member toward said taking lens when said slide cover is set to said photographing position, said center line being perpendicular to said moving direction of said slide cover.

7. A camera according to claim 6, wherein said taking lens is a zoom lens and said operation member is a zoom operating member, said zoom lens being moved toward a wide-angle side upon pressing one side of said zoom operating member, and said zoom lens being moved toward a telephoto side upon pressing the other side of said zoom operating member.

8. A camera according to claim 7, further comprising:

a decorative member fitted into an opening formed in said slide cover;

said operation member being contained in a circular concave formed in said decorative member, and said concave being provided with said shaft which is the center of said swinging operation member and via which said operation member is attached to said decorative member.

9. A camera according to claim 8, wherein the bottom of said concave is formed with two holes through which said respective projections protrude into said slide case to actuate said switches.

10. The camera of claim 1, wherein an entirety of the slide cover is arranged outside of the camera body.

11. The camera of claim 10, wherein no electrical components of the camera are secured to the slide cover.

* * * * *